United States Patent
Yokota et al.

(10) Patent No.: US 7,544,408 B2
(45) Date of Patent: Jun. 9, 2009

(54) BIAXIALLY ORIENTED POLYESTER FILM FOR MOLDING PROCESS

(75) Inventors: Nao Yokota, Saunderstown, RI (US);
Arron Carroll, Warwick, RI (US);
Hiroshi Furuya, Narragansett, RI (US);
Hideo Yanase, West Warwick, RI (US);
Terufumi Takayama, Anpachi-Gun (JP); Steven Sargeant, Kingston, RI (US)

(73) Assignee: Toray Plastics (America), Inc. RI (US)

( * ) Notice: Subject to any disclaimer, the term of this patent is extended or adjusted under 35 U.S.C. 154(b) by 0 days.

(21) Appl. No.: 11/705,825

(22) Filed: Feb. 14, 2007

(65) Prior Publication Data
US 2007/0243371 A1 Oct. 18, 2007

Related U.S. Application Data

(60) Provisional application No. 60/773,129, filed on Feb. 14, 2006.

(51) Int. Cl.
B32B 7/00 (2006.01)
B32B 27/06 (2006.01)
B32B 37/15 (2006.01)
B32B 27/20 (2006.01)
B32B 27/36 (2006.01)

(52) U.S. Cl. .................. 428/141; 428/212; 428/213; 428/215; 428/216; 428/323; 428/332; 428/339; 428/480; 428/910; 264/173.16; 264/288.4; 264/290.2

(58) Field of Classification Search .............. None
See application file for complete search history.

(56) References Cited

U.S. PATENT DOCUMENTS

| 4,615,939 | A | * | 10/1986 | Corsi et al. | 428/323 |
|---|---|---|---|---|---|
| 4,670,319 | A | * | 6/1987 | Katoh et al. | 428/141 |
| 4,732,814 | A | * | 3/1988 | Hatada et al. | 428/480 |
| 4,778,708 | A | | 10/1988 | Nishino et al. | |
| 4,798,759 | A | * | 1/1989 | Dallman et al. | 428/220 |
| 4,952,449 | A | * | 8/1990 | Okazaki et al. | 428/147 |
| 5,061,571 | A | * | 10/1991 | Sakamoto | 428/480 |
| 5,069,962 | A | * | 12/1991 | Okazaki et al. | 428/323 |

(Continued)

FOREIGN PATENT DOCUMENTS

JP 64-45699 2/1989

(Continued)

OTHER PUBLICATIONS

International Search Report and Written Opinion, mailed Oct. 15, 2007, directed to corresponding International Patent Application No. PCT/US07/03680.

*Primary Examiner*—Vivian Chen
(74) *Attorney, Agent, or Firm*—Morrison & Foerster LLP

(57) ABSTRACT

Described are smooth biaxially oriented films and methods of making smooth biaxially oriented films for molding processes. The films may include an outer film layer A, and an outer film layer B that includes particles. Layer A has a SRa roughness of from 1 nm to 5 nm and a SRz roughness of from 10 nm to 100 nm. Layer B has a SRa roughness of from 5 nm to 50 nm and a SRz roughness of from 10 nm to 200 nm. The SRa and SRz of layer B is larger than the SRa and SRz of layer A.

25 Claims, 2 Drawing Sheets

2-layer

U.S. PATENT DOCUMENTS

| | | | |
|---|---|---|---|
| 5,294,474 A | | 3/1994 | Assante et al. |
| 5,354,595 A | * | 10/1994 | Yamamoto et al. ........... 428/147 |
| 5,366,783 A | * | 11/1994 | Utsumi et al. ................ 428/141 |
| 5,476,707 A | * | 12/1995 | Fiard et al. ................... 428/141 |
| 5,529,832 A | * | 6/1996 | Masuda et al. ............... 428/212 |
| 5,626,942 A | * | 5/1997 | Okamoto et al. ............. 428/141 |
| 5,912,074 A | | 6/1999 | Aoyama et al. |
| 5,919,550 A | * | 7/1999 | Koseki et al. ............. 428/847.4 |
| 5,976,668 A | * | 11/1999 | Chiba et al. ................. 428/141 |
| 6,117,483 A | * | 9/2000 | Ono et al. .................... 427/129 |
| 6,159,579 A | * | 12/2000 | Mizutani et al. ............. 428/141 |
| 6,162,527 A | * | 12/2000 | Ogawa et al. ................ 428/141 |
| 6,238,782 B1 | * | 5/2001 | Hellmann et al. ............ 428/216 |
| 6,331,344 B1 | * | 12/2001 | Okazaki et al. .............. 428/141 |
| 6,468,627 B2 | * | 10/2002 | Ono et al. .................... 428/141 |
| 6,551,686 B1 | * | 4/2003 | Hellmann et al. ............ 428/141 |
| 6,761,968 B2 | * | 7/2004 | Kusume et al. .............. 428/328 |
| 7,022,388 B2 | * | 4/2006 | Hashimoto et al. .......... 428/34.9 |
| 7,026,064 B1 | * | 4/2006 | Tsunekawa et al. ....... 428/847.4 |
| 2001/0055674 A1 | * | 12/2001 | Hellman et al. .............. 428/216 |

FOREIGN PATENT DOCUMENTS

| | | | |
|---|---|---|---|
| JP | 3-253317 | | 11/1991 |
| JP | 03-052935 | * | 3/1997 |
| JP | 2002-133642 | * | 5/2002 |
| JP | 2003-289990 | | 10/2003 |
| JP | 2004-223800 | | 8/2004 |
| JP | 2005-82785 | | 3/2005 |
| JP | 2005-205825 | * | 8/2005 |
| WO | WO 03/047853 | | 6/2003 |

* cited by examiner 2-layer

BIAXIALLY ORIENTED POLYESTER FILM FOR MOLDING PROCESS

CROSS REFERENCE TO RELATED APPLICATION

This application claims the benefit of U.S. Provisional Application Ser. No. 60/773,129, filed Feb. 14, 2006

FIELD OF INVENTION

The present disclosure relates to smooth films and methods of making smooth films with easy handling characteristics. More particularly the disclosure is related to biaxially oriented films for molding processes.

BACKGROUND OF INVENTION

Biaxially oriented polyester films are often used in printing, coating and metalizing applications such as magnetic tapes, thermal transfer ribbons, packaging, optical applications and in many other web converted products because of their favorable properties. These properties include thermal stability, dimensional stability, and chemical resistance. Biaxially oriented polyester films are particularly frequently used for carrier films in transfer processes such as in-mold stamping, hot stamping and similar procedures.

Recently, end-users have desired improved image characteristics from stamped or molded parts. In particular, the desire for high gloss and precision stamping of an image on the surface of the transferred parts has increased. Furthermore, for molded parts used in electronic display applications, such as cellular phones or PDAs (personal digital assistants), there is a desire for a smooth surface on the display in order to produce a superior image. To achieve such image and surface attributes, the surface of the carrier biaxially oriented polyester film is preferably smooth. However, the smoother the surface, the higher the friction of the film, which makes the films more difficult to handle. Especially in the in-mold stamping processes, it is customary to provide a very smooth converting layer, such as a release layer, and a hard coating layer on the surface of the carrier biaxially oriented polyester film. These smooth converting layers can cancel the slippery effect of the biaxially oriented polyester film, and can make the carrier difficult to handle, which causes winding issues, blocking issues and other commercially important yield related issues.

There are a plethora of examples of biaxially oriented polyester films for stamping or molding in the prior art. However, these described structures do not fully satisfy the requirements of both high smoothness and easy handling.

Published Japanese Patent applications JP A Sho-64-45699 and JP A Hei-3-253317 describe traditional and general concepts of polyester films for stamping or molding. Japanese Patent Application Number 2003289990 describes a mold release film constructed by laminating a mold release layer to at least one side of a biaxially oriented polyester film including a polyester based on 1,4-cyclohexanedicarboxylic acid and 1,4-cyclohexanedimethanol moieties. Japanese Patent Application Number 2004223800 describes a polyester film for stamping having an anti-static layer on the surface of the mold contact layer in order to improve productivity and converter's yield. However, there is no quantitative description about any smoothness requirements in these applications.

Japanese Patent Application Number 200582785 describes a polyester film for transfer materials having an anti-static layer on the surface of the die contact layer in order to improve productivity and converter's yield, and having a smooth surface onto the parts in order to transfer a clear image on the parts. Particularly, the example 4 of the art discloses a polyester film including A/B/C 3-layer structure of which surface onto the parts has the smoothness of 3 nm SRa and 200 nm Rmax (SRt), of which surface onto the die has the roughness of 13 nm SRa. However, to achieve the highly glossy and ultra smooth transferred surface of the parts, smaller protrusions compared with the protrusion of the art are required on the surface of the carrier polyester film. Furthermore, the roughness of the surface onto the die must be controlled more in order to make less of an influence to the surface of the parts under the conditions of the molding process.

Films, for example two layer films, are disclosed in the following U.S. patents, the disclosures of each of which are totally incorporated by reference herein, U.S. Pat. Nos. 4,615,939; 4,732,814; 4,778,708; 4,798,759; 4,952,449; 5,069,962; 5,294,474; and 5,626,942. The appropriate components and process aspects of the each of the foregoing U.S. Patents may be selected for the present disclosure in embodiments thereof.

SUMMARY OF THE INVENTION

The disclosure relates generally to smooth film with easy handling and more particularly to biaxially oriented films for molding process.

One embodiment is a biaxially oriented polyester film for a molding process. The film includes an outer film layer A, and an outer film layer B that includes particles. Layer A has a SRa roughness of from 1 nm to 5 nm and a SRz roughness of from 10 nm to 100 nm. Layer B has a SRa roughness of from 5 nm to 50 nm and a SRz roughness of from 10 nm to 200 nm. The SRa and SRz of layer B is larger than the SRa and SRz of layer A.

Preferably, the volume average particle diameter of the largest particle in layer B is greater than a thickness of layer B. Preferably, the film satisfies the following formula:

$$0.3 < tB/dB \leq 2.0,$$

wherein tB is the thickness of layer B and dB is the volume average particle diameter of the largest particle in layer B.

Layer A in some embodiments may not include any particles. Preferably, if layer A includes particles, the volume average particle diameter of the particles in layer A is less than 0.5 micrometers. Preferably, the particles in layer B have a volume average particle diameter of 0.3 to 1.5 micrometers.

Preferably, film layer A has a thickness of 10 to 50 micrometers and film layer B has a thickness of 0.6 to 3 micrometers. Layer A and layer B may include polyester.

The film may further include one or more additional layers such as adhesion promotion layers, anti-static layers, release layers, oligomeric protective layers, and combinations thereof.

Layer A may include the same particles as layer B or different particles. Preferably, the particles include non-agglomerated particles. In embodiments, the particles may include one or more of the following particles: polymer particles, cross-linked polystyrene resin particles, cross-linked acrylic resin particles, cross-linked styrene particles, acrylic resin particles, polyimide particles, silica particles, calcium carbonate particles, alumina particles, titanium dioxide particles, clay particles, and talc particles.

Layer A further include a selected functionalization such as adhesion promotion, release, hard coating, abrasion protection, antibacterial properties, embossability, or a combination thereof.

An embodiment of a method for preparing a biaxially oriented polyester film for a molding process includes co-extruding a film comprising an outer film layer A, and an outer film layer B comprising particles. Layer A has a SRa roughness of from 1 nm to 5 nm and a SRz roughness of from 10 nm to 100 nm. Layer B has a SRa roughness of from 5 nm to 50 nm and a SRz roughness of from 10 nm to 200 nm. The SRa and SRz of layer B is larger than the SRa and SRZ of layer A.

The processes and films illustrated herein include, in various exemplary embodiments, tB and dB are selected such that tB and dB of the largest particle in layer (B) are 0.3<tB/dB≦2.0, preferably 0.5<tB/dB≦1.5, more preferably 0.5<tB/dB≦1.0, the particles in layer (A) are selected such that they have a major dimension dA of greater than about 0 to about 0.5 micrometers; the particles in layer (B) selected to have a major dimension dB of about 0.3 to about 1.5 micrometers; the particles in layer (B) are selected to have a major dimension dB of about 0.3 to about 1.5 micrometers; film layer (A) selected to have a film thickness of about 10 to about 50 micrometers; film layer (B) selected to have a film thickness of about 0.6 to about 3 micrometers; preferably, layer (A) is particle free; particles selected for layers (A) and (B) include a single particle type or a mixture of different particle types; and combinations of these various embodiments.

DETAILED DESCRIPTION OF THE INVENTION

In various exemplary embodiments, a biaxially oriented polyester film is disclosed for use with a molding process. The biaxially oriented polyester film can be inserted as a carrier or a protector between the die and the part and then separated from the part.

In embodiments, a process for producing a biaxially oriented polyester film includes co-extruding at least two outer layers, a layer (A) and a layer (B). Each of these outer layers possessing different properties from one another. An A/B structure is the simplest film including both of these layers and can be produced by extrusion and then laminated through a feed-block.

Figure 1:
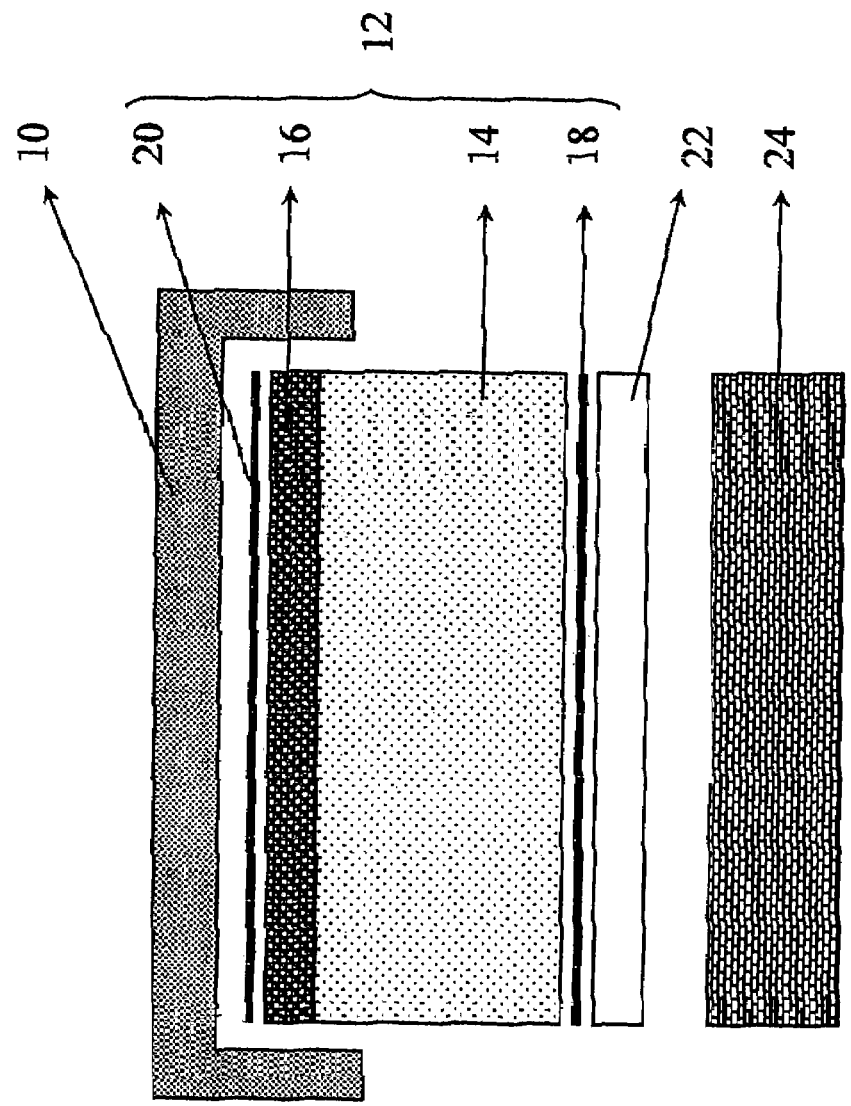
FIG. 1 is a diagram of a two layer biaxially oriented polyester film.

FIG. 1 illustrates a representative two layer biaxially oriented polyester film shown in relation to a die 10. Film 12 includes layers 14 (layer (A)) layer 16 (layer (B)), optional additional layer 18 (additional layer (A)'), optional additional layer 20 (additional layer (B)'), and converting layer or layers 22. Converting layer 22 is disposed adjacent to the part 24, which is to be molded by die 10.

Figure 2:
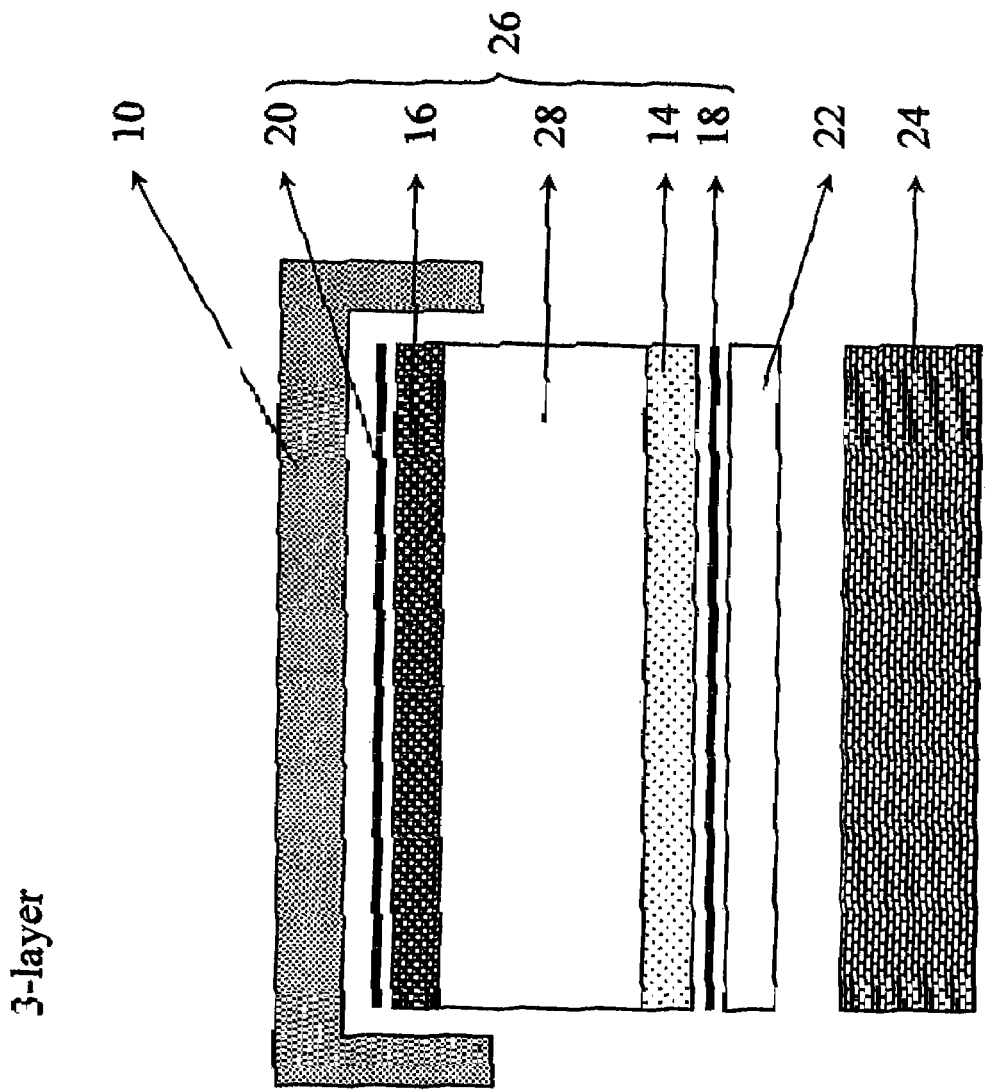
FIG. 2 is a diagram of a three layer biaxially oriented polyester film.

Multilayer structures are also contemplated. An architecture including more than a 3-layer structure such as, for example, A/C/B, is also contemplated. Referring to FIG. 2, a representative 3 layer biaxially oriented polyester film 26 is shown in relation to die 10 for molding part 24. Film 26 includes layer 14 (layer (A)), layer 16 (layer (B)), optional additional layer 18 (additional layer (A)'), optional additional layer 20 (additional layer (B)'), inner layer 28 (inner layer C), and converting layer or layers 22. In this embodiment, the inner layer, for example (C), is preferably selected to make no or minimal inimical influence on the surface properties of layers (A) and (B).

Furthermore, in embodiments, additional layers (A') and/or (B') situated on layers (A) and/or (B) are also contemplated. For example, in embodiments, additional layers such as adhesion promotion layers, anti-static layers, release layers, oligomeric protective layers, etc. may be provided on layers (A) and/or (B). Such additional layers are preferably selected so as to impart little or no adverse effect to the surface properties of layers (A) and (B).

In embodiments, outer layer (A) is configured to face or be disposed adjacent to the part 24 in the mold process and is selected to have an ultra smooth surface. The rougher surface of layer (B) is configured to face or be disposed adjacent to die 10.

In embodiments, the film is modified to impart selected characteristics to the film. For example, the process may further include modifying the surface of layer (A) to effect a selected functionalization, for example, including but not limited to, adhesion promotion, improved release characteristics, hard coating, abrasion protection, antibacterial properties, embossability, or a combination thereof.

In embodiments, the 3-D central plane average roughness (SRa) of layer (A) is preferably from about 1 nm to about 5 nm, more preferably from about 1 nm to about 4 nm. The 3-D ten-point average roughness (SRz) of layer (A) is preferably about 10 nm to about 100 nm, more preferably from about 10 nm to about 50 nm. In embodiments, if additional layers such as (A') are provided, preferably these layers include the same surface roughness properties. Protrusions greater than about 100 nm on layer (A) will make holes on the parts after transfer. The presence of holes of this size can be detected visually as a hazy image.

In various embodiments, the surface roughness of outer layer (B), which faces the die in the transfer process, is controlled. Preferably, layer (B) has a SRa of from about 5 nm to about 50 nm or from about 8 nm to about 50 nm. Preferably, layer (B) has a SRz of from about 10 nm to about 200 nm, more preferably from about 10 nm to about 150 nm. The surface property of additional layers such as layer (B'), for example an anti-static layer, is selected to have similar properties. The surface properties of layer (B) are valuable to the handling properties of the film. Accordingly, preferably the surface of this layer is rougher than the surface of layer (A). However, if large protrusions exist on the surface of layer (B), these protrusions could impart an adverse effect to the surface of the parts through layer (A) when the biaxially oriented polyester film is processed, such as during exposure to high temperature and pressure conditions in molding processes. To avoid this influence, preferably the SRz of layer (B) is less than about 200 nm, more preferably less than about 150 nm.

In embodiments, layer (A) has particles with a particle diameter dA and a thickness tA. Similarly, layer (B) has particles with a diameter dB and a thickness tB. The particle diameters dA and dB are the volume average diameters of the particles.

If the thickness of layer (B) is much greater than the particle size dB of the particles in layer (B), the particles agglomerate, etc. This can produce an irregular surface on the surface of layer (B), which could impart an adverse effect to the surface of the parts through layer (A) when the biaxially oriented polyester film is processed such as during exposure to high temperature and pressure conditions in molding processes.

In embodiments, the diameter dB of particles in layer (B) and the thickness of layer (B) tB are selected so as to control the surface characteristics of layer (B), for example, selected so that the particles in layer (B) align. Preferably, the thickness tB of layer (B) is selected to be thinner than the diameter dB of the largest particle in layer (B). In embodiments, the relationship of particle size to film layer thickness is selected wherein the upper limit of the thickness tB of layer (B) is two times the particle diameter dB of the largest particle in layer (B). For example, in embodiments, tB and dB are preferably comply to formulas (1)-(3) below:

$$0.3 < tB/dB \cdot 0.8 \quad (1)$$

$$0.3 < tB/dB < 2.0 \quad (2)$$

$$0.5 < tB/dB < 1.0 \quad (3)$$

In a selected embodiment, the particle size dB is two times the thickness of layer (B) so that the particles protrude through layer (B). In a further selected embodiment, the particles in layer (B) are selected such that they align.

In embodiments, the surface roughness of layer (A) is controlled by the selection of not only the particle size of layer (A) but also the thickness of layer (A) and particle size of layer (B). For example, in embodiments the relationship between the diameter dB of the particles in layer (B) and the thickness tA of layer (A) are controlled to affect the surface properties of the various layers.

The diameter (dA) of the particles in layer (A) is preferably less than about 0.5 micrometers, more preferably less than about 0.3 micrometers. If desired, layer (A) may be particle free so as to achieve an ultra smooth surface.

The thickness of layer (A) is selected in embodiments in relation to the diameter of particles in layer (B). Preferably, the thickness (tA) of layer (A) is greater than about 10 micrometers. Preferably, layer (A) has a thickness of from about 10 micrometers to about 50 micrometers. If the thickness of layer (A) is less than about 10 micrometers, the polyester film could be too thin and flexible to support. In addition, at such a reduced thickness, particles in layer (B) could have an adverse effect on the surface properties of layer (A) by migrating through or protruding through layer (A).

In embodiments, the film layers (A) and (B) include polyester and the polyester is preferably a polymer including an aromatic dicarboxylic acid as a main acid component and an aliphatic glycol as a main glycol component. Illustrative examples of aromatic dicarboxylic acids include terephthalic acid, naphthalenedicarboxylic acid, isophthalic acid and the like. Illustrative examples of aliphatic glycol include ethylene glycol, trimethylene glycol, cyclohexane dimethanol and the like. These polyester materials can be prepared by any of known methods. Typically, the polyester, especially the polyester for layer (B), is prepared by solid phase polymerization in order to reduce the oligomer content which may cause contamination issues in the molding process due to the accumulation of oligomer on the die under high temperature conditions.

In embodiments, the particles in layers (A) and (B) are the same or different and are selected from organic particles, inorganic particles, or a mixture or combination thereof. The particles selected for layers (A) and (B) can be a single particle type or a mixture or combination of particles. Illustrative examples of suitable organic particles include polymer particles such as cross-linked polystyrene resin particles, cross-linked acrylic resin particles, cross-linked styrene and acrylic resin particles, polyimide particles and the like. Illustrative examples of suitable inorganic particles include silica, calcium carbonate, alumina, titanium dioxide, clay, talc and the like. The particles are preferably non-agglomerated particles because agglomerated particles having wide distribution in size may make it difficult to control the protrusion and properties of the surface of the biaxially oriented polyester film.

The biaxially oriented polyester films illustrated herein can be produced by any method as known in the art. For example, a process can be selected wherein pellets of polyester for layer (A), layer (B) and the additional layers are dried and then extruded separately and laminated through a feed block. The polyester can be filtered using high accuracy filters to reduce defects in the polymer. The polymer of layer (B) can be extruded using a vent type two screw extruder to control the output, thereby controlling the variation of the thickness of layer (B). The resulting melt curtain is quenched on a casting drum, and then biaxially oriented. In embodiments, the film is oriented biaxially using a simultaneous method to reduce the scratches on the film.

As described above, this biaxially oriented polyester film may have additional coating layers (A') and/or (B') on the surface of layer (A) and/or (B). Illustrative examples of the coating layers include an adhesion promoting layer, an antistatic layer, a release layer, an oligomer blocking layer, a hard coating layer and the like. Any known method may be used to coat these layers, such as an in-line method or an off-line method, using a gravure coater, a bar coater, a spin coater, a kiss coater and the like. If desired, the additional layers may be coated by an in-line method using a gravure coater to achieve reasonable process efficiency and quality of the coating layer.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Test Methods (1) Thickness

The total thickness of the biaxially oriented polyester films was measured using a micro gauge meter and the thickness of each co-extruded layer was determined based upon a ratio of extruder output. Thickness was also measured using a secondary ion mass spectrograph (SIMS). This method is described in U.S. Pat. No. 5,919,550, which is hereby incorporated by reference herein in its entirety.

(2) Organic Particle

The particles were placed on the object stage of an electron microscope without overlapping them as much as possible and observed at a magnification of 10,000 to 100,000 times using a scanning electron microscope or transmission electron microscope. In the case of a scanning electron microscope, a platinum film of about 200 angstroms was vapor deposited onto the surface of a sample using a sputtering apparatus beforehand. From the screen or photographed image, the areas of at least 200 particles were measured to calculate the equivalent diameters, and from the area equivalent diameters, the volumes of the individual particles were calculated. Based on the volumes, the volume average particle diameter was calculated. This method is described in U.S. Pat. No. 5,912,074, which is hereby incorporated by reference herein in its entirety.

(3) Inorganic Particle

A sample slurry was added to a solvent (methanol) such that the concentration of the slurry/solvent was adequate to show adequate light transmission. This solution was pipetted into a Honeywell Microtrac X100 machine. The average particle size and distribution was then measured via this machine.

(4) Surface Roughness

SRa, SRq, SRz and SRt of the biaxially oriented polyester films were measured by a non-contact 3-D roughness meter "WYCO NT2000". The polyester films were cut to specific sizes and stretched tight to make the film flat. The prepared film was put on the stage of the roughness meter and measured and calculated under the condition of "PSI mode", "Threshold modulation 12%", "Size 736×480", "Sampling 1.61 micrometer" and "Filter 0.25 l/mm" for the surface of layer (A), wherein, SRa, SRq, SRz and SRt represent 3-D central plane average roughness, 3-D root-mean-square roughness, 3-D ten-point average roughness and 3-D maximum height, respectively. To determine the size of maximum protrusion, SRz is selected over SRt because SRt counts the only maximum protrusion and will show an uneven number if there is an unexpectedly contaminated protrusion such as a dust or a defect, while SRz averages 10 maximum protrusions to reduce unevenness.

(5) Coefficient of Friction (C.O.F)

Friction of the biaxially oriented polyester films was measured with the use of a Testing Machine, Inc. slip tester (TMI-Model #32-06) using ASTM D1894-95. The polyester films were cut to specified sizes. One sheet of polyester was clamped, the one surface (in the table 3, (X)) of the sample up, onto an 18" MD (machine direction) and 6" TD (transverse direction) glass plate. Another piece of polyester film was mounted using double-sided tape to a 2.5" and 2.5"200 g sled, with another surface (in table 3, (Y)') of the sample down. The sled was placed on top of the glass plate and attached to the load sensing device. The sled was then placed over the film on the glass plate at 6 in/min. The only contact during the testing was the polyester film surface (X) rubbing against the polyester film surface (Y)'. The measuring distance used to calculate the value of static was 1" and 4" for of dynamic.

Preferably, the films have a static coefficient of friction ($\mu_{static}$) measured front to back of <0.55, more preferably <0.45, most preferably <0.40. Preferably, the film has a dynamic coefficient of friction ($\mu_{dynamic}$) measured front to back of <0.55, more preferably <0.45, most preferably <0.40.

(6) Preparation of Molded Parts

Biaxially oriented polyester films were cut into sheets of 4"×4" in size and one sheet was applied onto the surface of the die with adhesive tape. The sheet was inserted with the direction shown in table 4. Then, molten polypropylene resin ("PRIME POLYPRO F122G" of PRIME POLYMER) was injected onto the sheet and molded using an injection molding machine (TOSHIBA IS80 EPN-2A) and a flat circle disk shaped die with a 150 mm diameter mirrored surface, under the condition described below. After molding, the polyester film peeled off from the molded part easily. The size of the molded parts was approximately 150 mm in diameter and had a thickness of 3 mm. Furthermore, molded parts without using a biaxially oriented polyester film were prepared as a control sample using the same machine, same resin and under the same conditions.

Temperature of the cylinder: 200° C.
Temperature of the die: 40° C.
Time of injection: 20 seconds
Pressure of the injection (polymer): 50 MPa
Time of cooling: 15 seconds (7) Gloss of the Molded Parts The molded part was placed on a plane table with matted black surface and a gloss meter was pushed onto the molded part. Gloss was measured with 60 degree mode using "mirror-TRI-gloss" of BYK-Gardner GmbH, taking the average number of five data points.

(8) The Surface Images of the Molded Parts

The surface images of the molded parts were observed looking at reflected light shone by a flashlight in a dark room.

(9) Surface Resistivity

The surface resistivity of the biaxially oriented polyester films coated by anti-static agents was measured with "The Trek Model 152 Resistance Meter" having concentric ring electrodes of TREK, INC.

Example 1

Polyethyleneterephthalate polyester pellets as listed in Table 1 were mixed according to the blend ratio shown in table 2, extruded using a vent-type two-screw extruder and filtered for the outer layer (B). Pellets listed in Table 1 were mixed according to the blend ratio shown in Table 2, dried, then extruded via extruder and filtered for the outer layer (A). These melt streams were fed through a rectangular joining zone and laminated into a two layer co-extruded (A)/(B) structure. The resulting melt curtain was quenched on a casting drum, oriented in the machine direction with a roller stretcher, subsequently oriented in the traverse direction and heat-set and relaxed using a chain driven stretcher under the conditions listed in Table 2, and finally wound up. The biaxially oriented polyester film had the thickness shown in table 2. The biaxially oriented polyester film had extremely preferable surface properties including an ultra smooth surface of layer (A), well controlled protrusions on the surface of layer (B), and adequately low friction, as listed in Table 3. During making film, there were no processing issues and the film could be wound easily without any defect.

Two types of molded parts were prepared using this film as shown in Table 4. Mold 1 had a glossy and flat surface, which was preferable in the molded samples, while Mold 1' had a hazy surface.

Example 1A

A biaxially oriented polyester film having an anti-static coating layer on the surface of layer (B) was produced in the same manner as described in Example 1 according to the blend and the conditions listed in table 2. This anti-static coating layer consists of thiophene conductive polymers, as described in WO03047853, and is coated by a traditional in-line coating method before traverse direction stretching under the conditions shown in table 2. The coated biaxially oriented polyester film had the thickness shown in table 2 and had preferable surface properties, ultra smooth surface of layer (A), well controlled protrusions on the surface of layer (B), adequately low friction, and very low surface resistivity, as listed in Table 3. During the production of the film, there were no processing issues and the film could be wound very easily without any apparent defect.

Two types of the molded parts were prepared by using this film as shown in Table 4. Mold 1A had a glossy and flat surface, which was preferable in the molded samples, while Mold 1A' had a hazy surface.

Example 2

A biaxially oriented polyester film was produced in the same manner as described in Example 1 according to the blend and the conditions listed in table 2. The film had the thickness shown in table 2 and had preferable surface properties including an ultra smooth surface of layer (A), controlled protrusions on the surface of layer (B), and adequately low friction, as listed in table 3. During the production of the film, there were no processing issues and the film could be wound easily without any defect. Two types of molded parts were prepared using this film as shown in Table 4. Mold 2 had a very shiny gloss surface, and was the preferable sample. Mold 2' had hazy surface.

Example 3 and 3A

Plain biaxially oriented polyester film (Example 3) and coated biaxially oriented polyester film (Example 3A) were produced in the same manner as described in Examples 1 and 1A according to the blend and the conditions listed in table 2. The films had the thickness shown in table 2 and had preferable surface properties, super smooth surface of layer (A), super controlled protrusions on the surface of layer (B), adequately low friction, and the coated film had very low surface resistivity, as listed in table 3. During the production of the film, there were no processing issues and the film could be wound easily without any defect.

Two types of molded parts were prepared by using the film of Example 3A as shown in Table 4. Mold 3A had an ultra shiny, gloss surface, and was the most preferable sample.

Comparative Example 1

Biaxially oriented polyester film was produced in the same manner as described in Example 1 according to the blend and conditions listed in Table 2. The film had a thickness shown in Table 2 and had preferable surface properties including an ultra smooth surface of layer (A), and adequately low friction. However, protrusions on the surface of layer (B) were not controlled and, accordingly, there were many big protrusions on the surface of layer (B) as listed in Table 3. During film production, there were no processing issues and the film could be wound easily without any defect. Two types of molded parts were prepared using this film as shown in Table 4. The surface of Mold Comp. 1 was shiny and glossy, but somewhat wavy like an orange peel. Mold Comp 1' had a hazy surface.

Comparative Example 2

Pellets listed in Table 1 were mixed according to the blend ratio shown in Table 2, extruded using a vent-type two-screw extruder and filtered for the outer layer (D). Pellets listed in Table 1 were mixed according to the blend ratio shown in Table 2, dried, then extruded via extruder and filtered for the inner layer (C). These melt streams were fed through a rectangular joining zone and laminated into a three layer co-extruded (D)/(C)/(D) structure. The resulting curtain was quenched on a casting drum, and oriented in the machine direction with a roller stretcher, subsequently oriented in the traverse direction and heat-set and relaxed using chain driven stretcher under the conditions listed in Table 2, and finally wound up. The biaxially oriented polyester film had a thickness shown in Table 2 and had commonplace surfaces of layers (D) and had commonplace friction as listed in table 3. During film making, there were no processing issues and the film could be wound moderately. Mold Comp. 2, the molded part prepared using this film as shown in Table 4, had a hazy surface and was the moderate sample.

Comparative Example 3

A film was produced in the same manner as described in Comparative Example 2 according to the blend and conditions listed in Table 2. The biaxially oriented polyester film had the thickness shown in Table 2, and had commonplace surfaces of layers (D) although it had adequately low friction as listed in Table 3. During production of the film, there were no processing issues and the film could be wound easily. Mold Comp. 3, the molded part prepared by using this film as shown in Table 4, had a very hazy surface, and was the worst sample except for the Control.

Comparative Example 4

A film was produced in the same manner as described in Comparative Example 2 according to the blend conditions listed in Table 2. The biaxially oriented polyester film had the thickness shown in Table 2 and had a fairly smooth surface of layers (D) but had commonplace friction, which was higher than the others as listed in Table 3. During production of the film, a special core having a larger diameter was used in order to avoid winding issues. Mold Comp. 4, the molded part prepared by using this film as shown in Table 4, had a very shiny, gloss surface.

TABLE 1

| Pellet | Polyester | Type | Particle Shape | Size | Content |
|---|---|---|---|---|---|
| a | Polyethyleneterephthalate | | No particle | | |
| b | Polyethyleneterephthalate | Styrene/dibisphenol A diglycidyl ether dimethacrylate copolymer | Non-agglomerated Spherical | 0.3 μm | 2% |
| c | Polyethyleneterephthalate | Calcium carbonate | Non-agglomerated Hexahedral | 0.8 μm | 3% |
| d | Polyethyleneterephthalate | Calcium carbonate | Non-agglomerated Hexahedral | 1.1 μm | 1% |
| e | Polyethyleneterephthalate | Silica | Agglomerated | 2.6 μm (Average) | 3% |
| f | Polyethyleneterephthalate | Alumina | Agglomerated | 0.1 μm (Average) | 1.5% |
| g | Polyethyleneterephthalate | Silica | Agglomerated | 0.2 μm (Average) | 0.6% |
| h | Polyethyleneterephthalate | Inert particle Particles in the polyester by interaction of phosphorus compound and the catalyst | n/a | n/a | n/a |

TABLE 1-continued

| Pellet | Polyester | Type | Particle Shape | Size | Content |
|---|---|---|---|---|---|
| i | Polyethyleneterephthalate | Styrene/dibisphenol A diglycidyl ether dimethacrylate copolymer | Non-agglomerated Spherical | 0.8 μm | 1% |
| j | Polyethyleneterephthalate | Styrene/dibisphenol A diglycidyl ether dimethacrylate copolymer | Non-agglomerated Spherical | 0.45 μm | 1% |
| y | Polyethyleneterephthalate | Recycled pellet from Comp. example 3 | | | |

TABLE 2

| | | Example 1 | | Example 1A | | Example 2 | |
|---|---|---|---|---|---|---|---|
| Layer (A) | Structure | (A)/(B) | | (A)/(B) | | (A)/(B) | |
| | Blend/% | Pellet a | 95 | Pellet a | 95 | Pellet a | 95 |
| | | Pellet b | 5 | Pellet b | 5 | Pellet b | 5 |
| | Thickness/μm | 37 | | 37 | | 36 | |
| Layer (B) | Blend/% | Pellet a | 50 | Pellet a | 50 | Pellet a | 40 |
| | | Pellet c | 50 | Pellet c | 50 | Pellet b | 10 |
| | | | | | | Pellet d | 50 |
| | Thickness/μm | 1 | | 1 | | 2 | |
| | additional coating | No | | Yes Thiophene anti-static 1 wt % water solution #6 bar rod | | No | |
| Total thickness/μm | | 38 | | 38 | | 38 | |
| MD stretching temperature/° F. | | 220 | | 220 | | 220 | |
| MD stretching ratio/% | | 343 | | 343 | | 343 | |
| TD stretching temperature/° F. | | 240 | | 240 | | 240 | |
| TD stretching ratio/% | | 400 | | 400 | | 400 | |
| Heat Set Temperature/° F. | | 450 | | 450 | | 450 | |
| TD Relax ratio/% | | 2.5 | | 2.9 | | 2.5 | |

| | | Example 3 | | Example 3A | | Comp 1 | |
|---|---|---|---|---|---|---|---|
| Layer (A) | Structure | (A)/(B) | | (A)/(B) | | (A)/(B) | |
| | Blend/% | Pellet a | 97 | Pellet a | 97 | Pellet a | 95 |
| | | Pellet b | 3 | Pellet b | 3 | Pellet b | 5 |
| | Thickness/μm | 37 | | 37 | | 36 | |
| Layer (B) | Blend/% | Pellet a | 50 | Pellet a | 50 | Pellet a | 93 |
| | | Pellet j | 50 | Pellet j | 50 | Pellet e | 7 |
| | Thickness/μm | 1 | | 1 | | 2 | |
| | additional coating | No | | Yes Thiophene anti-static 1 wt % water solution #6 bar rod | | No | |
| Total thickness/μm | | 38 | | 38 | | 38 | |
| MD stretching temperature/° F. | | 220 | | 220 | | 220 | |
| MD stretching ratio/% | | 343 | | 343 | | 343 | |
| TD stretching temperature/° F. | | 240 | | 240 | | 240 | |
| TD stretching ratio/% | | 400 | | 400 | | 400 | |
| Heat Set Temperature/° F. | | 450 | | 450 | | 450 | |
| TD Relax ratio/% | | 2.9 | | 2.9 | | 2.5 | |

| | | Comp 2 | | Comp 3 | | Comp 4 | |
|---|---|---|---|---|---|---|---|
| Layer (C) | Structure | (D)/(C)/(D) | | (D)/(C)/(D) | | (D)/(C)/(D) | |
| | Blend/% | Pellet a | 65 | Pellet a | 48 | Pellet a | 100 |
| | | Pellet x | 35 | Pellet h | 16 | | |
| | | | | Pellet e | 1 | | |
| | | | | Pellet y | 35 | | |
| | Thickness/μm | 34 | | 32 | | 47 | |
| Layer (D) | Blend/% | Pellet a | 69 | Pellet a | 49 | Pellet a | 94 |
| | | Pellet d | 7 | Pellet h | 49 | Pellet b | 5 |
| | | Pellet f | 22 | Pellet e | 2 | Pellet i | 1 |
| | | Pellet g | 2 | | | | |

TABLE 2-continued

|  |  |  |  |
|---|---|---|---|
| Thickness/μm | 2 | 2 | 1.5 |
| additional coating | No | No | No |
| Total thickness/μm | 38 | 36 | 50 |
| MD stretching temperature/° F. | 210 | 240 | 205 |
| MD stretching ratio/% | 348 | 400 | 330 |
| TD stretching temperature/° F. | 230 | 240 | 230 |
| TD stretching ratio/% | 400 | 379 | 400 |
| Heat Set Temperature/° F. | 460 | 440 | 460 |
| TD Relax ratio/% | 2.3 | 3.5 | 1.3 |

TABLE 3

| | | Example | | |
|---|---|---|---|---|
| | | 1 | 1A | 2 |
| Structure | | (A)/(B) | (A)/(B) | (A)/(B) |
| | | Surface roughness | | |
| Layer (A) | SRa/nm | 3.8 | 3.7 | 3.3 |
| | SRq/nm | 4.8 | 4.5 | 4.2 |
| | SRz/nm | 48.3 | 49.1 | 44.4 |
| | SRt/nm | 61.6 | 59.9 | 54.0 |
| | | Surface roughness | | |
| Layer (B) | SRa/nm | 9.6 | 9.9 | 11.8 |
| | SRq/nm | 12.2 | 12.8 | 15.6 |
| | SRz/nm | 114.1 | 116.2 | 161.0 |
| | SRt/nm | 169.7 | 171.7 | 204.7 |
| Coefficient of friction | $\mu_{static}$ | (B) – (A)' 0.39 | (B) – (A)' 0.32 | (B) – (A)' 0.37 |
| | $\mu_{dynamic}$ | (B) – (A)' 0.37 | (B) – (A)' 0.30 | (B) – (A)' 0.35 |
| Surface resistivity of anti-static surface | Ω/sq | n/a | E5 | n/a |
| Process aptitude | | Good Easy to wind into roll | Good Easy to wind into roll | Good Easy to wind into roll |

| | | Example | | |
|---|---|---|---|---|
| | | 3 | 3A | Comp 1 |
| Structure | | (A)/(B) | (A)/(B) | (A)/(B) |
| | | Surface roughness | | |
| Layer (A) | SRa/nm | 2.4 | 2.7 | 4.0 |
| | SRq/nm | 3.1 | 3.9 | 4.3 |
| | SRz/nm | 30.8 | 34.5 | 57.1 |
| | SRt/nm | 38.7 | 40.5 | 81.7 |
| | | Surface roughness | | |
| Layer (B) | SRa/nm | 5.7 | 6.0 | 11.1 |
| | SRq/nm | 7.5 | 8.1 | 16.4 |
| | SRz/nm | 81.8 | 81.1 | 299.2 |
| | SRt/nm | 99.8 | 97.9 | 430.8 |
| Coefficient of friction | $\mu_{static}$ | (B) – (A)' 0.36 | (B) – (A)' 0.34 | (B) – (A)' 0.37 |
| | $\mu_{dynamic}$ | (B) – (A)' 0.34 | (B) – (A)' 0.31 | (B) – (A)' 0.33 |
| Surface resistivity of anti-static surface | Ω/sq | n/a | E5 | n/a |
| Process aptitude | | Excellent Very easy to wind into roll | Excellent Very easy to wind into roll | Excellent Very easy to wind into roll |

| | | Example | | |
|---|---|---|---|---|
| | | Comp 2 | Comp 3 | Comp 4 |
| Structure | | (D)/(C)/(D) | (D)/(C)/(D) | (D)/(C)/(D) |
| | | Surface roughness | | |
| Layer (D) | SRa/nm | 12.0 | 29.8 | 3.3 |
| | SRq/nm | 17.3 | 40.5 | 4.5 |
| | SRz/nm | 250.0 | 448.1 | 74.9 |
| | SRt/nm | 320.4 | 570.1 | 115.3 |
| Coefficient of friction | $\mu_{static}$ | (D) – (D)' 0.39 | (D) – (D)' 0.39 | (D) – (D)' 0.40 |
| | $\mu_{dynamic}$ | (D) – (D)' 0.38 | (D) – (D)' 0.34 | (D) – (D)' 0.40 |

TABLE 3-continued

| | | | | |
|---|---|---|---|---|
| Surface resistivity of anti-static surface | Ω/sq | n/a | n/a | n/a |
| Process aptitude | | Fair<br>Not difficult to wind into roll | Good<br>Easy to wind into roll | Below average could wind into roll with a special core |

TABLE 4

| | | Sample name | | | |
|---|---|---|---|---|---|
| | | Mold 1 | Mold 1' | Mold 2 | Mold 2' |
| Film sample in table 2 and 3 | | 1 | 1 | 2 | 2 |
| Direction of the film | | Part//(A)/(B)//Die | Part//(B)/(A)//Die | Part//(A)/(B)//Die | Part//(B)/(A)//Die |
| Size of the part | Diameter/mm | 147 | 147 | 147 | 148 |
| | Thickness/mm | 3 | 3 | 3 | 3 |
| Gloss | 60° | 94 | 89 | 94 | 87 |
| Surface image of the part | | Excellent<br>Very shiny, glossy and flat | Bad (NG)<br>Very Hazy | Good<br>Very shiny and glossy | Bad (NG)<br>Very Hazy |

| | | Sample name | | | |
|---|---|---|---|---|---|
| | | Mold Comp. 1 | Mold Comp. 1' | Mold Comp. 2 | Mold Comp. 3 |
| Film sample | | Comp. 1 | Comp. 1 | Comp. 2 (TA30) | Comp. 3 |
| Direction of the film | | Part//(A)/(B)//Die | Part//(B)/(A)//Die | Part//(D)/(C)/(D)//Die | Part//(D)/(C)/(D)//Die |
| Size of the part | Diameter/mm | 148 | 147 | 147 | 147 |
| | Thickness/mm | 3 | 3 | 3 | 3 |
| Gloss | 60o | 94 | 91 | 92 | 89 |
| Surface image of the part | | Wavy (NG)<br>Shiny and glossy but wavy surface like orange peel | Bad (NG)<br>Very Hazy | Moderate (NG)<br>Hazy | Bad (NG)<br>Very Hazy |

| | | Sample name | |
|---|---|---|---|
| | | Mold Comp. 4 | Control |
| Film sample | | Comp. 4 | (n/a) |
| Direction of the film | | Part//(D)/(C)/(D)//Die | (Parts//Die) |
| Size of the part | Diameter/mm | 147 | 147 |
| | Thickness/mm | 3 | 3 |
| Gloss | 60o | 94 | 84 |
| Surface image of the part | | Good<br>Very shiny and glossy | Worst (NG)<br>Very hazy, mottled pattern |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

This application discloses several numerical ranges in the text and figures. The numerical ranges disclosed are intended to support any range or value within the disclosed numerical ranges even though a precise range limitation is not stated verbatim in the specification because this invention can be practiced throughout the disclosed numerical ranges. It is also to be understood that all numerical values and ranges set forth in this application are necessarily approximate.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A biaxially oriented polyester film for a molding process comprising:
    an outer film layer A, and an outer film layer B comprising particles, layer A has a SRa roughness of from 1 nm to 5 nm, a SRz roughness of from 10 nm to 100 nm and a thickness of 36 micrometers to 50 micrometers, layer B has a thickness of 0.6 to 3 micrometers, a SRa roughness of from 5 nm to 50 nm and a SRz roughness of from 10 nm to 200 nm, and the SRa and SRz of layer B is larger than the SRa and SRz of layer A.

2. The film of claim 1, wherein a volume average particle diameter of the largest particle in layer B is greater than a thickness of layer B.

3. The film of claim 1, wherein the film satisfies the following formula:

$$0.3 < tB/dB \leq 2.0,$$

wherein tB is the thickness of layer B and dB is the volume average particle diameter of the largest particle in layer B.

4. The film of claim 1, wherein layer A comprises particles and the volume average particle diameter of the particles in layer A is less than 0.5 micrometers.

5. The film of claim 1, wherein the particles in layer B have a volume average particle diameter of 0.3 to 1.5 micrometers.

6. The film of claim 1, wherein layer A is particle free.

7. The film of claim 1, wherein layer A comprises different particles than layer B.

8. The film of claim 1, further comprising one or more additional layers selected from the group consisting of adhesion promotion layers, anti-static layers, release layers, oligomeric protective layers, and combinations thereof.

9. The film of claim 1, wherein layer A and layer B comprise polyester.

10. The film of claim 1, wherein the particles are selected from the group consisting of polymer particles, cross-linked polystyrene resin particles, cross-linked acrylic resin particles, cross-linked styrene particles, acrylic resin particles, polyimide particles, silica particles, calcium carbonate particles, alumina particles, titanium dioxide particles, clay particles, talc particles, and combinations thereof.

11. The film of claim 1, wherein the particles comprise non-agglomerated particles.

12. The film of claim 1, wherein layer A further comprises a selected functionalization.

13. The film of claim 12, wherein the selected functionalization comprises adhesion promotion, release, hard coating, abrasion protection, antibacterial properties, embossability, or a combination thereof.

14. A method for preparing a biaxially oriented polyester film for a molding process comprising:
co-extruding a film comprising an outer film layer A, and an outer film layer B comprising particles,
wherein layer A has a SRa roughness of from 1 nm to 5 nm, a SRz roughness of from 10 nm to 100 nm and a thickness of 36 micrometers to 50 micrometers, layer B has a SRa roughness of from 5 nm to 50 nm and a SRz roughness of from 10 nm to 200 nm, and the SRa and SRz of layer B is larger than the SRa and SRz of layer A.

15. The method of claim 14, wherein a volume average particle diameter of the largest particle in layer B is greater than a thickness of layer B.

16. The method of claim 14, wherein the film satisfies the following formula:

$$0.3 < tB/dB \leq 2.0,$$

wherein tB is the thickness of layer B and dB is the volume average particle diameter of the largest particle in layer B.

17. The method of claim 14, wherein layer A comprises particles and the volume average particle diameter of the particles in layer A is less than 0.5 micrometers.

18. The method of claim 14, wherein the particles in layer B have a volume average particle diameter of 0.3 to 1.5 micrometers.

19. The method of claim 14, wherein film layer B has a thickness of 0.6 to 3 micrometers.

20. The method of claim 14, wherein layer A is particle free.

21. The method of claim 14, wherein layer A comprises different particles than layer B.

22. The method of claim 14, further comprising modifying the surface of layer A to effect a selected functionalization.

23. The process of claim 22, wherein the selected functionalization comprises adhesion promotion, release, hard coating, abrasion protection, antibacterial properties, embossability, or a combination thereof 24. A biaxially oriented polyester film for a molding process comprising:
an outer film layer A, and an outer film layer B comprising particles having a volume average particle diameter of 0.3 to 1.5 micrometers, layer A has a SRa roughness of from 1 nm to 5 nm, a SRz roughness of from 10 nm to 100 nm and a thickness of 36 micrometers to 50 micrometers, layer B has a SRa roughness of from 5 nm to 50 nm and a SRz roughness of from 10 nm to 200 nm, and the SRa and SRz of layer B is larger than the SRa and SRz of layer A.

25. A biaxially oriented polyester film for a molding process comprising: an outer film layer A, and an outer film layer B comprising particles, layer A is particle free, has a SRa roughness of from 1 nm to 5 nm, a SRz roughness of from 10 nm to 100nm and a thickness of 36 micrometers to 50 micrometers, layer B has a SRa roughness of from 5 nm to 50 nm and a SRz roughness of from 10 nm to 200 nm, and the SRa and SRz of layer B is larger than the SRa and SRz of layer A.

* * * * *